Patented Oct. 23, 1951

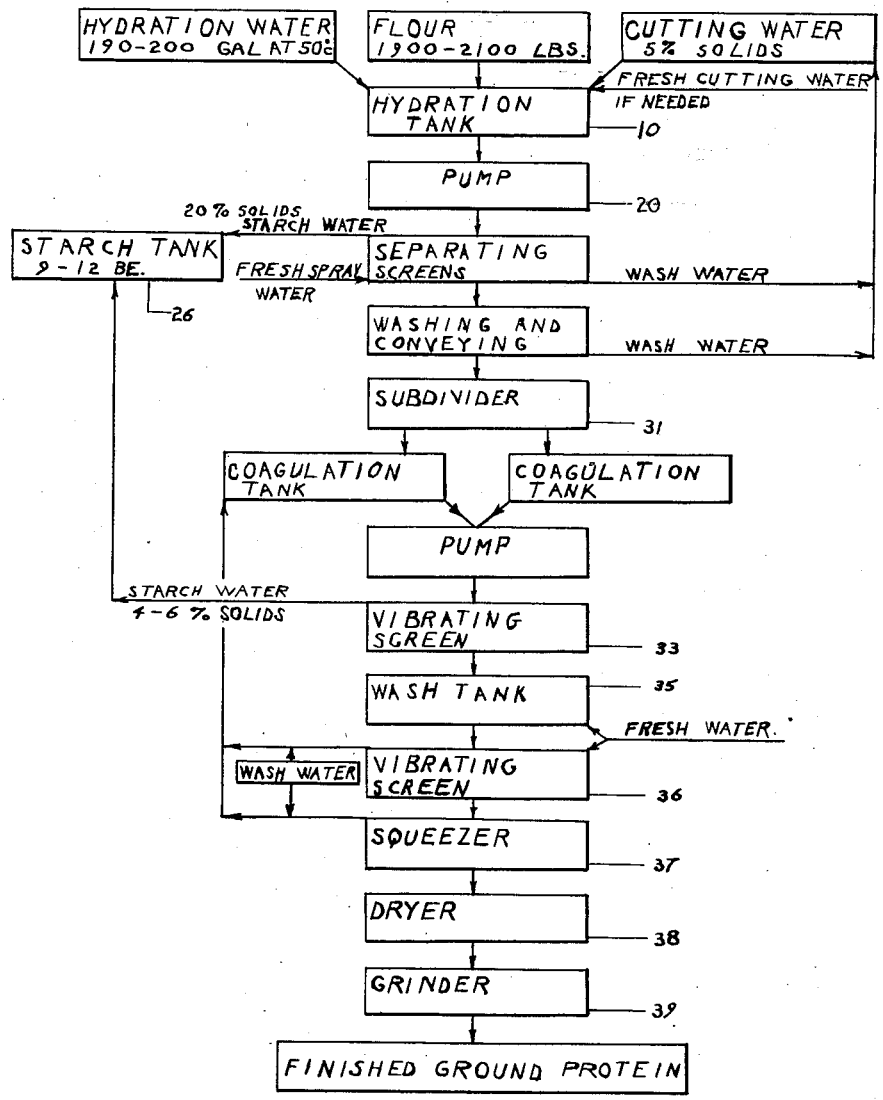

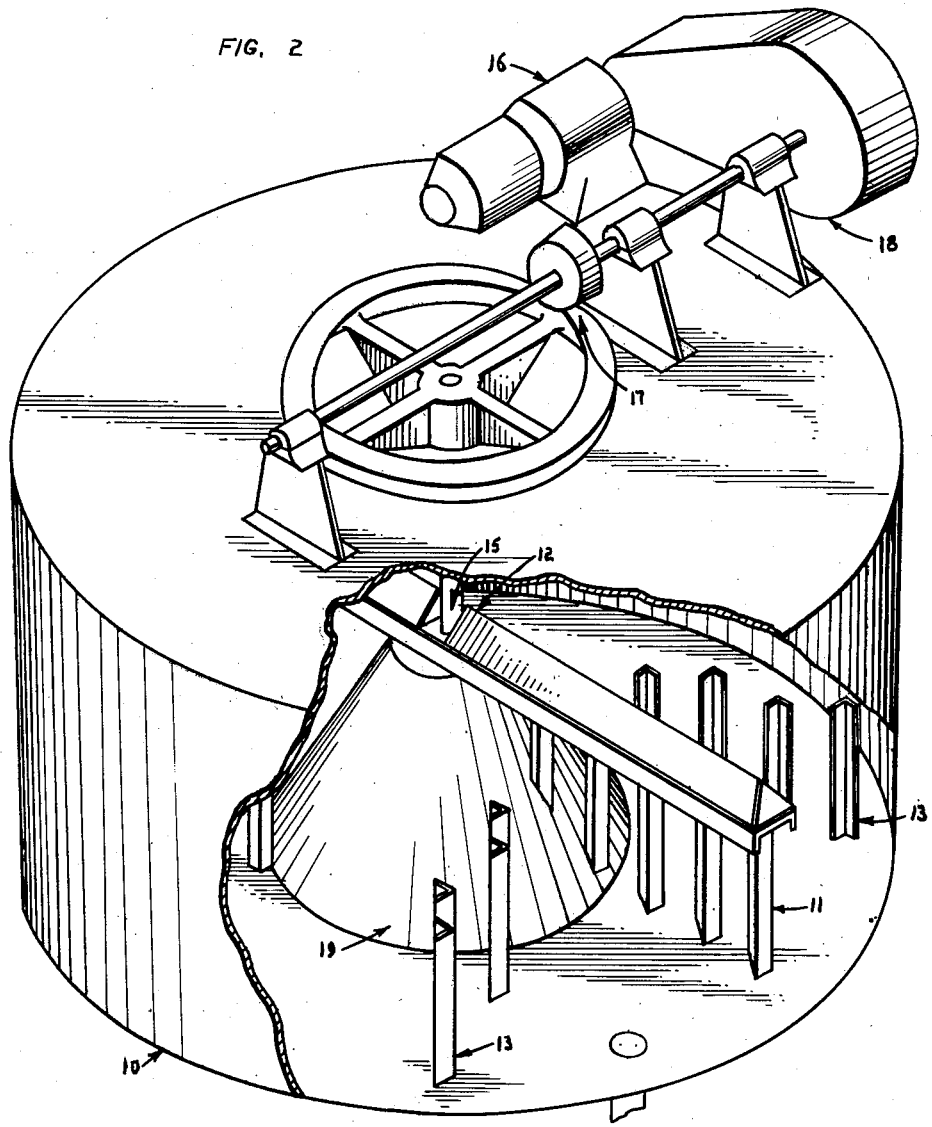

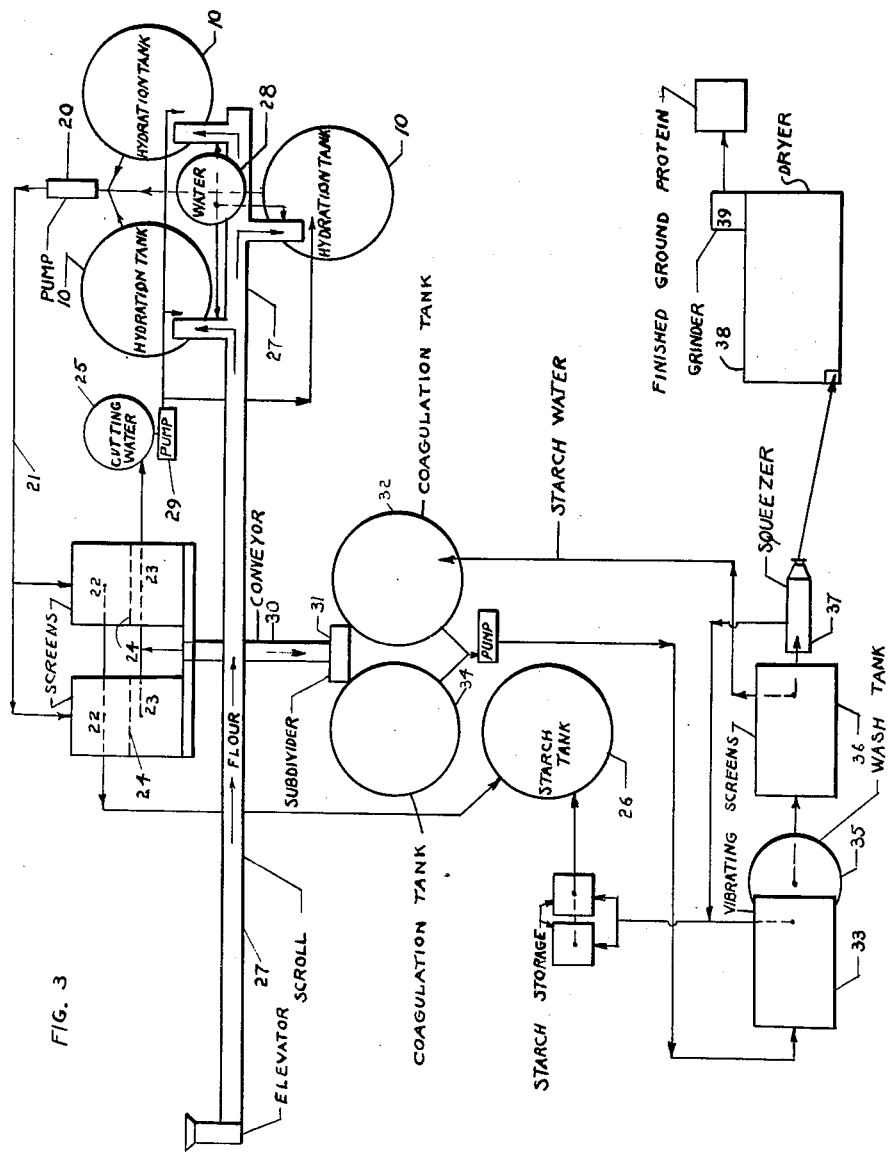

2,572,225

UNITED STATES PATENT OFFICE 2,572,225

MANUFACTURE OF WHEAT PROTEIN AND STARCH

James F. Walsh, Holland, Mich., David M. Levitt, Great Neck, N. Y., and Abraham H. Goodman, Holland, Mich., assignors to Doughnut Corporation of America, New York, N. Y., a corporation of New York Application November 1, 1944, Serial No. 561,476

3 Claims. (Cl. 127—67)

1

This invention relates to wheat protein and starch, and among other objects aims to produce wheat protein of higher purity (75% and higher protein content) by methods which also improve the efficiency of recovery of the wheat starch and the quality of the product.

The nature of the invention may be readily understood by reference to one illustrative method and apparatus for performing it. This method and apparatus are illustrated in the accompanying drawings.

In said drawings:

Fig. 1 is a diagram or flow sheet of the illustrative method;

Fig. 2 is a perspective view (partly broken to show the interior) of hydrating apparatus; and Fig. 3 is a diagram of the apparatus for producing the protein and illustrating the sequence of operation.

At one time wheat was the most important raw material for starch and protein, but these substances have not in the prior art processes been economically or satisfactorily recovered together. Substantial loss or inefficient recovery of either renders the process impracticable. Among other methods of separating wheat protein from the starch are experiments carried on by the Northern Research Laboratory: one, a so-called batter process involves hydration of the gluten so it can be separated from the starch; but this method has not been developed beyond this point or to the point where it could be made a part of a complete process. Loss, partial loss, deterioration, or extreme difficulty in handling, of any of the constituents is alone sufficient to render a given process impracticable.

According to the illustrative process the wheat is first dry milled by a conventional milling procedure to remove most of the cellulosic materials (bran and shorts), and germ, the latter containing a substantial amount of solubles. These by-products and their uses are of course well known. The remainder (i. e. the wheat lacking bran, shorts and germ) may be used in comminuted form, or as flour or clears. Clears, which comprise a grade of flour below the so-called patent flours, is advantageous because of its cheapness. For present purposes it is the equivalent of flour although it contains more fiber, ash and fat than patent flours. For convenience we shall use the term flour in a generic sense to include wheat substantially lacking in bran, shorts and germ regardless of grade or fineness. After this preliminary separation the clears or their equivalent, comprising mainly protein (gluten) and starch

2 are treated by mixing with water to hydrate the gluten to form a soft dough (wherein the starch particles are occluded) and develop the cohesive strength of the gluten. The amount of water must be limited to avoid initial dispersion of the gluten; preferably the water including the initial water content of the flour is from 85 to 115% of the dry weight of the flour. Within these limits the water should preferably not exceed that necessary to make a dough sufficiently soft to facilitate hydration of the gluten and development of its cohesive strength. The amount of water necessary for this purpose may vary somewhat with the temperature and the gluten content of the dough.

As the gluten progressively hydrates the dough becomes increasingly sticky and elastic. It may be pulled into long strings without breaking. The extreme elasticity is probably a property given to the dough by the starch, for relatively purer gluten, although much stronger than the dough, is much less elastic and breaks before it can be substantially elongated. It is important therefore that the starch be removed (i. e. washed out of the gluten as presently explained) before the gluten becomes tough and short. Mere washing of the dough is therefore impractical since the surface gluten toughens and forms large masses from the interior of which it is impossible by any practical means to wash the starch. Masses of partly washed gluten cannot be stretched to present large surfaces for washing since the gluten will prematurely break. Therefore while the dough is in its elastic state it is repeatedly drawn out or stretched into long strings or ropes so as to expose a maximum surface to the washing action of the added wash water. This is carried on continuously without affording the gluten an opportunity to agglomerate in large masses, and thus all portions of the dough are washed free of starch. As the gluten becomes pure and its elasticity decreases the strings repeatedly break and eventually they are reduced to small pieces or curds. These would agglomerate into an unwieldy mass if allowed to settle, hence agitation is continued until the starch slurry containing the gluten curds is removed and delivered for separating gluten from the starch slurry as presently explained.

Hydration preferably takes place in a mixing vessel to which the water and flour are added together, the water being heated to about 50° C. to obtain the desired characteristics of the dough with a minimum amount of water. The water temperature should not be high enough (preferably below 130° F.) to hydrate or paste the starch. One such mixing vessel 10 is illustrated in Fig. 2. The illustrative mixing elements comprise stationary and movable fingers or rakes passing between and relatively closely to the stationary fingers, which first mix the water and flour and then develop the necessary cohesive strength of the dough; and later cooperate to disintegrate the gluten as presently described. In this case the movable finger 11 projects downwardly from a rotary arm or sweep 12 which carries them between a plurality of series 13 of upwardly projecting stationary fingers 14. Preferably the fingers have relatively wide bases to facilitate mixing but their leading edges are preferably relatively sharp to assist in disintegrating the dough in the later stages of the process. In this case they are of angle section. Shaft 15 represents means for supporting and operating arm 12 to which it is connected at its middle. Motor 16, ring gear and pinion 17, and intermediate reduction and driving mechanism 18 represent means for rotating shaft 15. Preferably such means include adjustment for changing the speed of operation of arm 12. A central cone 19 prevents accumulation of agglomerated material on and near the shaft, where it cannot be adequately treated as next described.

The second operation performed by the relatively moving fingers is to facilitate hydration of the gluten and toughen it (i. e. make it cohesive enough) to prevent excessive disintegration in subsequent treatment. With flours having relatively low gluten content it is preferable to adjust or raise the gluten content by addition of flours having a relatively high gluten content so as to insure the development of sufficient strength in the hydrated gluten. After adequate hydration and toughening of the gluten the relatively moving fingers then function (as above stated) in conjunction with additional water then added to the vessel repeatedly to stretch the dough for washing out the starch and eventually to subdivide the gluten into smaller pieces or curds to permit more efficient washing out of the starch. Because of the difficulty of handling the hydrated gluten, it is particularly advantageous that the foregoing operation can be performed without intervening handling, as in the same apparatus and by the same means as used for hydrating the gluten. Thus all the starch except minor traces is separated from the gluten, and the resulting gluten, while subdivided, is nevertheless agglomerated in tough pieces of such size as to permit screen separation from the starch.

The amount of added "cutting water" is preferably carefully limited yet it is sufficient to wash the starch from the gluten efficiently to produce gluten with 75 to 80% or higher protein content. This result can be accomplished without dilutation of the water-starch slurry below 15 to 24% of solids (starch). Such a starch slurry requires no concentration to adapt it for use directly in various processes. The "cutting water" may be at tap temperatures, but in any event should be less than 130° F. to avoid pasting the starch.

The starch slurry containing the gluten curds is readily flowable and may advantageously be removed from the vessel 10 by a pump, preferably a rotary pump 20 (Fig. 1). The gluten is thus transformed in the same processing element from the dry flour condition through its difficult handling stage, to a flowable slurry whereby it can readily be removed and transferred for separation of the starch slurry. Apparently the latter prevents the pieces of gluten from adhering to apparatus or the means for delivering it for separation.

As here shown this is accomplished by discharging the slurry from the pump discharge conduit 21 upon a vibratory or similar screen 22 (Fig. 3). An inclined sheet metal screen works well since the gluten curds slide over it without adhering thereto. Preferably fine jets 23 of water further wash adhering starch from the gluten as it passes over the screen. As indicated in Fig. 1 this water may be fresh water. The jets of water preferably reach only the lower or discharge half of the screen so that this wash water can be kept separate from and not dilute the starch slurry which drains from the gluten in the upper half of the screen. For this purpose the collecting box below the screen is divided transversely at 24 to separate the starch slurry from the aforesaid wash water, the latter going to tank 25 and the starch slurry to the collecting tank 26 for such further use or treatment as is desired. This wash water containing about 5% solids is employed as the "cutting water" added to vessel 10 after hydration (see Fig. 1), thereby minimizing dilution of the starch slurry.

We have discovered that if the amount of solubles be limited, the resulting starch slurry may be directly used for conversion to sugar, in the fermentation industries, etc., without the treatment which has heretofore been necessary on account of the presence of excessive solubles in the starch slurry. Also if the amount of cellulosic materials in the gluten be kept low, it may be used satisfactorily in the manufacture of mono-sodium glutamate. In our process we have attained these objectives by eliminating the excessive solubles and cellulosic materials by the preliminary dry milling, above described, wherein the germ, bran and shorts which respectively contain the substantial amounts of solubles, and cellulosic materials, are removed. The result is that the starch slurry contains only about 2 to 4% of protein (based on the dry weight of the solids in the slurry) including from 1½ to 2% of soluble protein. This more particularly concerns our copending application Serial 562,980, now Patent 2,442,789, involving the starch phase of our invention.

As illustrated in Fig. 3, three gluten hydration tanks 10 are employed. These operate in succession so as to provide substantially continuous delivery to the separating screen 22 (two in this case). Flour is delivered by selective conveying means 27 to the tanks 10 in succession, as is also the warm hydrating water from tanks 28. Pump 20 may be selectively connected to each of the tanks. A pump 29 delivers the starch bearing wash water selectively to the tanks as desired for "cutting" the gluten.

When thus washed free of starch, the gluten tends to agglomerate in large sticky masses and is difficult to handle. These masses are advantageously immediately comminuted into small pieces and stabilized (by denaturing or coagulation by heat) before the pieces have an opportunity to contact with each other or parts of the apparatus. In stabilized condition the protein is no longer adhesive nor subject to enzymic alteration or spoilage, and can then be easily dewatered and dried.

According to one method (see Fig. 3) the gluten is conveyed by conveyor 30 (which may advantageously comprise a screw conveyor) after it falls from screen 22 to a subdivider, in this case in the form of an extruder 31. In the conveyor the gluten may be further washed to remove other adhering starch by means of fine water sprays, which drain through a screen in the bottom of the conveyor and thence are carried to the "cutting water" tanks 25. The amount of wash water used at this point is small.

The extruder subdivides the gluten into a multitude of small strings (to expose a large surface area) which are immediately (and before they can cohere with each other) introduced into water of at least 160° F. in tank 32. In this subdivided state the gluten is more readily denatured with a minimum loss of solubles. In its stabilized condition, the particles no longer readily decompose, and in their non-adhesive condition they can be readily handled. In the present case the material is dewatered by passing it over an oscillating or shaking screen 33. Any starch residue adhering to or contained in the gluten when denatured is effectively pasted by the hot water in the coagulating tank 32 and may be delivered to starch tank 26 without diluting the slurry in the latter tank below the limits of 15 to 24% starch.

This starch slurry is unique, since it is produced without tabling or other means of concentration. Yet without further treatment it is adapted for use in acid conversion to sugar and syrup (as described in our co-pending application Serial 562,980), in the fermentation industries, and in enzyme conversion.

The coagulating tank 32 may advantageously contain a stirring device which assists in circulating the hot water to minimize the coagulating time and also to break up any masses of gluten which may have resulted from agglomeration of the small pieces of extruded gluten before they were fully coagulated.

In the present case an alternate coagulation tank 34 is advantageously used while the first coagulation tank is being emptied. After leaving the screen 33 the material is placed in a wash tank 35 and then delivered to a second shaking screen 36, both of which are supplied with small amounts of fresh wash water to remove additional adhering starch; the wash water is then carried to the coagulating tanks 32 and 34 to supply the latter. This water with the pasted starch eventually leaves the circuit at the screen 33 and goes to the starch storage tank 26. Thereafter the protein is further dewatered by a squeezer 37, the water from which also helps to supply the coagulation tanks. Then the material is dried in dryer 38 and preferably subdivided by a grinder 39.

The pasting of any starch residue in the coagulated gluten transforms it to such condition that it may be effectively removed from the gluten, thereby raising the gluten to a purity (75 to 80% and higher) not heretofore possible in a closed process wherein all constituents are efficiently recovered.

The resulting product has many and more profitable uses for which a less pure gluten is not adapted, only one of which is in the manufacture of mono-sodium glutamate.

It should be noted that throughout the process closed circuits are employed wherein there is no loss of any valuable constituents. This is of great importance not only in the avoidance of excessive dilution but in the economy of the process and avoidance of stream pullution. The starch washed from the gluten at various stages of the process is returned to various points of the starch circuit.

Obviously the invention is not limited to the details of the illustrative method and apparatus, since these may be variously modified. Moreover it is not indispensable that all features of the invention be used conjointly since various features may be used to advantage in different combinations and subcombinations.

Having described our invention we claim:

1. The method of recovering from wheat flour, starch and gluten, the latter of at least 75% purity, which comprises mixing such flour with water to form a soft dough, said water being limited in amount so that with the initial moisture content of the flour the water equals about 85 to 115% of the dry weight of the flour, continuing the mixing until the gluten has hydrated sufficiently to revelop such cohesive strength as to resist dispersion on the subsequent addition of more water, then adding more water limited in amount as hereinafter defined and repeatedly stretching the dough into strands to expose large surfaces to the washing action of the added water to remove the starch from the gluten, continuing the stretching and washing action in the presence of such additional water until the starch has been substantially washed out of the gluten to form a slurry and the gluten in its thus purified condition breaks up by the aforesaid stretching operation into small pieces but large enough to permit mechanical separation from the starch slurry, washing the gluten with a limited amount of wash water for subsequent mixing with the flour as aforesaid, the aggregate amount of water used being limited so that the starch slurry contains from 15 to 24% starch solids, and then mechanically separating the purified gluten from the starch slurry.

2. The method of recovering from wheat flour starch and gluten, the latter of at least 75% purity, which comprises mixing in a vessel such flour with water below 130° F. in temperature and limited in amount to form a soft dough and insufficient to disperse the gluten, continuing the mixing to hydrate the gluten sufficiently to develop such cohesive strength in the gluten that it is not dispersed on mixing with additional water, then after the gluten has developed the aforesaid cohesive strength adding to the same vessel and without removal of the dough more water limited in amount as hereinafter defined and repeatedly stretching the dough in stranas to expose large surfaces to the washing action of the added water to remove the starch from the gluten, continuing the stretching and washing action in the presence of such additional water until the starch has been substantially washed out of the gluten to form a slurry and the gluten in its thus purified condition breaks up by the aforesaid stretching operation into small pieces but large enough to permit screen separation from the starch slurry, the aggregate amount of water used being limited so that the starch slurry contains from 15 to 24% starch solids, and then screen separating the purified gluten from the starch slurry.

3. The method of recovering from wheat flour starch and gluten of at least 75% purity which comprises mixing in a vessel such flour with water below 130° F. in temperature and limited in amount to form a soft dough and insufficient to disperse the gluten, continuing the mixing to hydrate the gluten to develop such cohesive strength in the gluten as to permit the dough to be repeatedly stretched into long strands, then after the gluten has developed such cohesive strength adding more water limited in amount as hereinafter defined and repeatedly stretching the dough in long strands to expose large surfaces to the washing action of the added water to remove the starch from the gluten, continuing the stretching and washing action in the presence of such additional water until the gluten has been purified by washing the starch out of the gluten to form a starch slurry and the gluten in its thus purified condition breaks up by the aforesaid stretching operation into curds but large enough to permit screen separation from the starch slurry, said curds being suspended in the starch slurry and maintained in separated condition thereby against agglomeration, the aggregate amount of water used being limited so that the starch slurry contains from 15 to 24% starch solids, and then conducting away the gluten curds suspended in the starch slurry to a screen to separate the purified gluten from the starch slurry.

JAMES F. WALSH.
DAVID M. LEVITT.
ABRAHAM H. GOODMAN.

REFERENCES CITED

The following references are of record in the file of this patent:

UNITED STATES PATENTS

| Number | Name | Date |
|---|---|---|
| 235,053 | Gassaway | Nov. 30, 1880 |
| 962,498 | Dunham | June 28, 1910 |
| 1,316,854 | Ostenberg | Sept. 23, 1919 |
| 1,948,453 | Barbade | Feb. 20, 1934 |
| 2,038,633 | Bienenstock | Apr. 28, 1936 |
| 2,238,307 | Brother et al. | Apr. 15, 1941 |
| 2,368,668 | Langford et al. | Feb. 6, 1945 |
| 2,388,902 | Callaghan et al. | Nov. 13, 1945 |
| 2,418,621 | Callaghan et al. | Apr. 8, 1947 |

FOREIGN PATENTS

| Number | Country | Date |
|---|---|---|
| 499,106 | Great Britain | Jan. 16, 1939 |
| 107,603 | Australia | June 15, 1939 |

OTHER REFERENCES

Osborne: "The Vegetable Proteins," Longmans, Green and Co., London (1924), pages 59–67.

Eynon and Lane, "Starch," Cambridge, 1928; page 144.

Shewfelt et al.: Canad. Chemistry and Process Industries, pp. 502; July 1944, copy in 99 Gluten Digest to 519.

Wihlfart: "A Treatise on Baking," pub. by Standard Brands Inc., New York city (1934), 2nd edition, page 14.